(12) United States Patent
Lang et al.

(10) Patent No.: US 11,281,316 B2
(45) Date of Patent: Mar. 22, 2022

(54) DYNAMIC TOUCH USER INTERFACE SYSTEMS AND METHODS

(71) Applicant: Bayerische Motoren Werke Aktiengesellschaft, Munich (DE)

(72) Inventors: Franziska Lang, Ventura, CA (US); Martin Francisco, Pasadena, CA (US); Eric Brown, North Hollywood, CA (US); Matthew Potter, Porter Ranch, CA (US); Paul Ferraiolo, Ventura, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/576,691

(22) Filed: Sep. 19, 2019

(65) Prior Publication Data
US 2021/0089148 A1  Mar. 25, 2021

(51) Int. Cl.
*G06F 3/041* (2006.01)
*B60K 37/06* (2006.01)

(52) U.S. Cl.
CPC .............. *G06F 3/041* (2013.01); *B60K 37/06* (2013.01); *B60K 2370/1434* (2019.05); *B60K 2370/20* (2019.05); *B60K 2370/741* (2019.05); *B60K 2370/744* (2019.05)

(58) Field of Classification Search
CPC ...... B60K 2370/741; B60K 2370/1434; B60K 2370/20; B60K 2370/744; B60K 37/06; G06F 3/041; G06F 3/0238; G06F 3/0202
See application file for complete search history.

(56) References Cited

U.S. PATENT DOCUMENTS

| | | | |
|---|---|---|---|
| 8,836,643 B2* | 9/2014 | Romera Joliff | G06F 3/016 345/168 |
| 2016/0103496 A1* | 4/2016 | Degner | G06F 3/0445 345/157 |
| 2017/0060249 A1* | 3/2017 | Scheufler | G06F 3/03547 |

* cited by examiner

*Primary Examiner* — Christopher E Leiby
(74) *Attorney, Agent, or Firm* — Crowell & Moring LLP

(57) ABSTRACT

A dynamic touch user interface system includes a touch-input interface, one or more visual indicators, and a plurality of sensors. The touch-input interface has a reference surface that covers one or more touch elements. The touch elements define an active area that allows user communication with a computer through touch. The active area is relocatable along the reference surface in response to detected circumstances. The visual indicators visually identify a location of the active area. The sensors detect the circumstances affecting a relocation of the active area.

17 Claims, 5 Drawing Sheets

DYNAMIC TOUCH USER INTERFACE SYSTEMS AND METHODS

FIELD OF THE INVENTION

The present invention relates generally to touch user interfaces, and more particularly to touch user interfaces that dynamically adjust their location in response to detected circumstances.

BACKGROUND OF THE INVENTION

Vehicle and other systems increasingly rely on receiving user input via touch user interfaces, i.e., user interfaces that allow communication with the computer elements of such systems via touch. These interfaces are typically fixed in a location that is predetermined according to where it is most comfortable for most users. As such, relocating such interfaces is difficult and costly, and cannot be performed dynamically and on-demand.

The fixed nature of such touch user interfaces becomes increasingly problematic as the user's posture relative to the interface changes. For example, as the driver of an automobile reclines in his/her seat, a touch user interface fixed to the dashboard or center console may become less ideally located. Indeed, as the automated driving capabilities of vehicles expand, there is an increasing likelihood that the traditional physical fixed layout of the vehicle interior, e.g., the locations of seats, controls, etc., becomes more fluid and adaptable to particular driving situations. In such circumstances, the traditional fixed touch user interfaces are inadequate.

As such, there is a need in the art for devices, systems and methods that do not suffer from the above drawbacks.

SUMMARY OF THE INVENTION

Disclosed and claimed herein are dynamic touch user interface systems and methods that overcomes the shortcomings of the prior art.

A dynamic touch user interface system is described herein. The dynamic touch user interface system includes a touch-input interface having a reference surface covering one or more touch elements that define an active area. The active area allows user communication with a computer through touch. The active area is relocatable along the reference surface in response to detected circumstances. The dynamic touch user interface system also includes one or more visual indicators that visually identify a location of the active area. In addition, the system a plurality of sensors that detect circumstances affecting a relocation of the active area.

A method for dynamically relocating a touch user interface is also described herein. In accordance with the method, an active area of a touch-input interface is defined. The touch-input interface has a reference surface covering one or more touch elements, and the active area corresponds to a location of the one or more touch elements. The active area allows user communication with a computer through touch. Further in accordance with the method, the active area is visually identified via one or more visual indicators. Still further in accordance with the method, circumstances influencing a relocation of the active area are detected via a plurality of sensors. Still further in accordance with the method, the active area is relocated in accordance with the detected circumstances. Still further in accordance with the method, the relocated active area is visually identified.

The present disclosure provides for a number of benefits and/or advantages over the prior art. For example, a more ergonomic and dynamically adaptable location for the touch user interface may be provided. As such, control may dynamically pass between driver and passenger areas. The dynamic adaptability may also facilitate user comfort and control among various modes of a multi-modal system. Vehicle aesthetic may also be improved, as the touch user interface may, when not in use, adapt to blend into the vehicle interior or move to an out of the way location.

Other objects, advantages, aspects and features of the present invention will be apparent to one skilled in the relevant art in view of the following detailed description of one or more exemplary embodiments.

BRIEF DESCRIPTION OF THE DRAWINGS

The features, objects, and advantages of the present invention will become more apparent from the detailed description, set forth below, when taken in conjunction with the drawings, in which like reference characters identify correspondingly throughout and wherein.

DETAILED DESCRIPTION OF THE PREFERRED EMBODIMENTS

Figure 1:
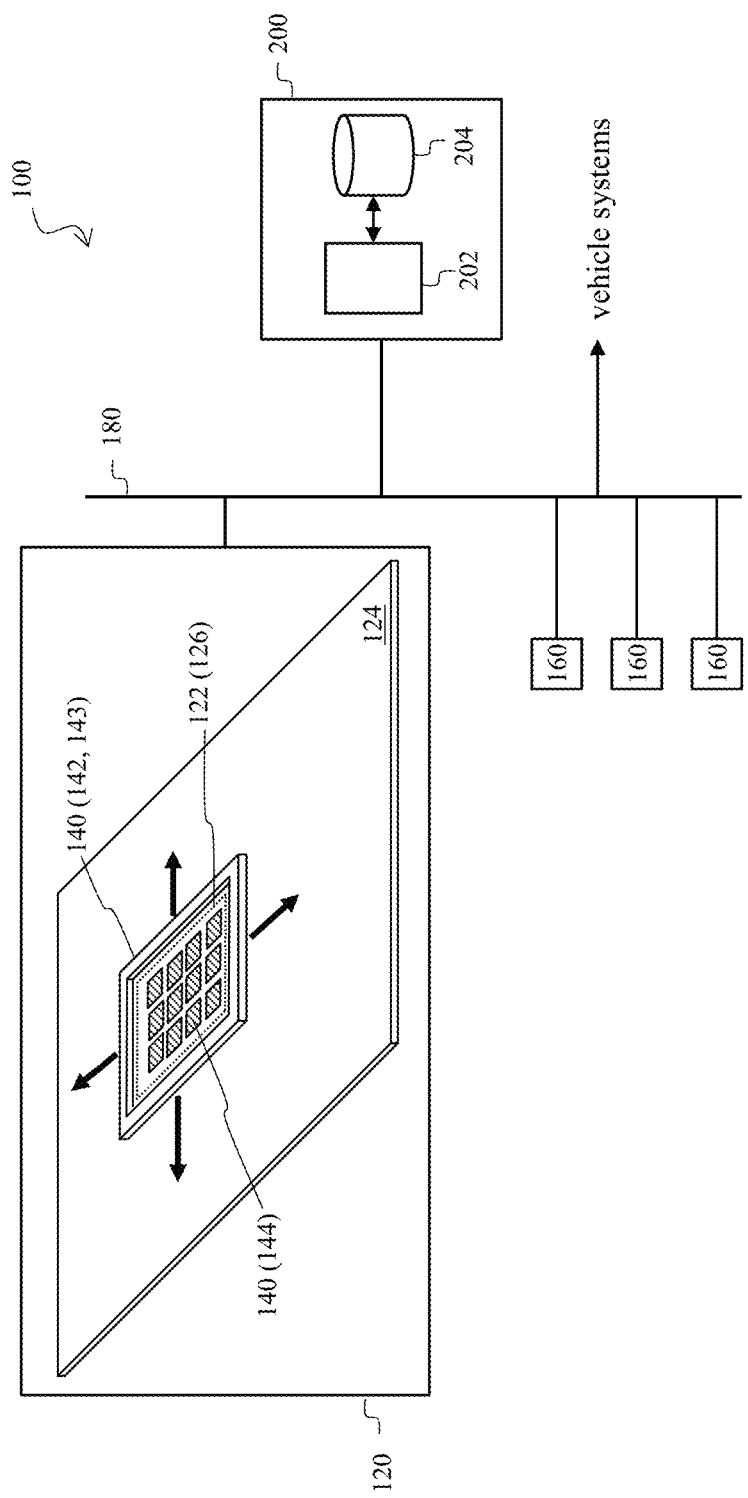
FIG. 1 illustrates an example system in accordance with one or more aspects of the present invention.

The above described drawing figures illustrate the present invention in at least one embodiment, which is further defined in detail in the following description. Those having ordinary skill in the art may be able to make alterations and modifications to what is described herein without departing from its spirit and scope. While the present invention is susceptible of embodiment in many different forms, there is shown in the drawings and will herein be described in detail at least one preferred embodiment of the invention with the understanding that the present disclosure is to be considered as an exemplification of the principles of the present invention, and is not intended to limit the broad aspects of the present invention to any embodiment illustrated. It will therefore be understood that what is illustrated is set forth for the purposes of example, and should not be taken as a limitation on the scope of the present invention.

The present invention generally relates to systems and methods for dynamically adjusting the location of a touch user interface in response to detected circumstances.

FIG. 1 illustrates an example system 100 in accordance with one or more embodiments of the present invention. The system 100 includes a touch-input interface 120, one or more visual indicators 140, and a plurality of sensors 160, each operatively coupled via network 180 to a control unit 200.

The touch-input interface 120 may be any type of user interface having at least one active area 122 capable of allowing a user to provide user input to a computer system (not shown) in accordance with a software application via touch, e.g., a touch-sensitive surface. Exemplary software applications include software applications for controlling various vehicle systems, such as vehicle entertainment systems, climate control systems, driver assistance systems, security systems, navigation systems, etc., as well as operating systems and other software applications. Accordingly, the touch-input interface may allow the user to communicate via the user input with one or more computers (e.g., vehicle control units) associated with the various vehicle systems, via the network 180.

The touch-input interface 120 may include a reference surface 124, and one or more touch elements 126 located beneath the reference surface 124, which touch elements 126 may define the active areas 122 on the reference surface 124, within which the touch elements 126 may be configured to detect the user input. The touch elements 126 may therefore incorporate any type of touch sensor technology, such as, resistive, capacitive, acoustic, infrared, optical touch sensing technology. It will further be understood that the touch-input interface 120 may be configured to recognize and receive various touch input actions, which may include clicking, scrolling, dragging, selecting, zooming, swiping, pointing, and other actions known for providing touch input via touch sensing technology, which actions may include statically or dynamically contacting the active area 122 at one or more locations of the active area 122.

The touch-input interface 120 may also be configured such that the location of the active area 122 may be adjusted in response to circumstances detected via the plurality of sensors 120. The relocation of the active area 122 may occur by moving the touch-elements 124, by the selective activation/deactivation of the touch elements 124, and/or by any other means, in response to the detected circumstances. Such circumstances may include any and all circumstances indicating that the user intends to utilize the touch-input interface at a particular location.

The reference surface 122 may be an interior surface of a vehicle (not shown), and may include, for example, a dashboard surface, a console surface, a door surface, a ceiling surface, a floor surface, an armrest surface, or any other vehicle surface accessible by the user. It will be understood, however, that the principles of operation described herein are applicable to dynamic touch user interfaces for interacting with computer systems other than those of vehicles, such as, for example, desktop computer systems, in which case the active area 122 of the touch-input interface 120 adjusts its location along a reference surface 122 that may be, for example, a desk surface, in response to detected circumstances.

The visual indicators 140 may be any type of device or devices capable of visually indicating the location of the touch-input interface 120, whether in whole or in part. The visual indicators 140 may include physical objects 142 and/or light objects 146, such as frames, dials, switches, buttons, etc., which serve to visually identify the active areas 122 of the touch-input surface 120.

As used herein, the term "light objects" refers to projected images, such as images of frames, dials, switches, buttons, etc. projected onto the reference surface. Such projection may be via backlighting and/or frontlighting by way of one or more illumination elements 146, which may be located behind, above and/or internal to the reference surface 124. Accordingly, for example, an image of a dial may be projected onto the reference surface 124 at the active area 122, the virtual rotation of which by the user via touching the active area 122 may be registered as user input by the touch-input interface 120. Similarly, for example, an image of a button, an icon, or any other image, projected onto the reference surface 124 may be virtually interacted with by the user so as to provide the user input.

Visual indicators 140 that are physical objects may also be configured to translate user touch input from the visual indicator 140 to the touch-input surface 120. For example, where the visual indicator 140 is a physical dial, rotation of the physical dial by the user may be translated to the touch-input interface 120, which may register the rotation as if the user were directly providing the user touch input to the touch-input interface 120. The physical object visual indicators 140 may also include one or more illumination elements 146 for projecting the light object visual indicators 140.

The plurality of sensors 160 may be any type and/or arrangement of sensors capable of detecting circumstances under which the user is likely to desire an adjustment to the location of the touch-input interface 120. The detected circumstances may include physical and/or electronic circumstances indicating that the user intends to utilize the touch-input interface at a particular location. Physical circumstances may include, for example, the body position, eye gaze, etc. of the user. Electronic circumstances may include, for example, electronic signals indicating a mode of operation (e.g., sport mode, leisure mode, etc.). Sets of detected circumstances may be correlated to particular adjustments to the location of the touch-input interface 120, which correlations may be stored in a database. The system 100 may, for example, track the user's hand and relocate the active area 122 in accordance with the user relocating his/her hand to a different location.

The network 180 may be any type of network, wired or wireless, configured to facilitate the communication and transmission of data, instructions, etc. from one component to another component of the system 100 and/or the other vehicle systems (not shown). For example, the network 180 may be a local area network (LAN) (e.g., Ethernet or other IEEE 802.03 LAN technologies), Wi-Fi (e.g., IEEE 802.11 standards), wide area network (WAN), virtual private network (VPN), global area network (GAN), any combination thereof, or any other type of network.

The control unit 200 may include a processor 202 and a memory 204. The processor may instruct other components, such as the touch-input interface 120, to perform various tasks based on the processing of information and/or data that may have been previously stored or has been received, such as instructions and/or data stored in memory 164. The processor 202 may be a standard processor, such as a central processing unit (CPU), or may be a dedicated processor, such as an application-specific integrated circuit (ASIC) or a field programmable gate array (FPGA).

Memory 204 stores at least instructions and/or data that can be accessed by processor 202. For example, memory 204 may be hardware capable of storing information accessible by the processor, such as a ROM, RAM, hard-drive, CD-ROM, DVD, write-capable, read-only, etc. The set of instructions may be included in software that can be implemented by the system 100. It should be noted that the terms "instructions," "steps," "algorithms," and "programs" may be used interchangeably. Data can be retrieved, manipulated or stored by the processor 202 in accordance with the set of instructions or other sets of executable instructions. The data may also be stored as a collection of data. Memory 204 may also store the database.

It is to be understood that the configuration illustrated in FIG. 1 serves only as an example and is thus not limited thereto. The system 100, for instance, may include numerous other components (e.g., vehicle systems components) connected to network 180, and may include more than one of each network component. Network 180 may also be connected to other networks.

Figure 2:
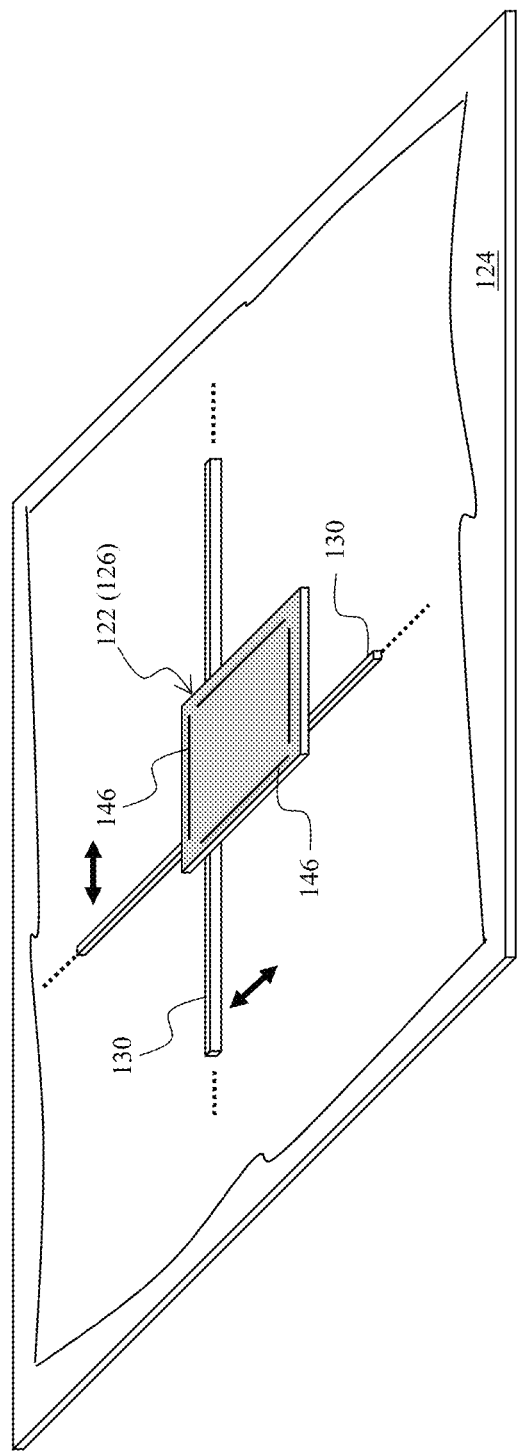
FIG. 2 illustrates the example system in accordance with one or more aspects of the present invention.

FIG. 2 illustrates an exemplary embodiment in which the location of a single touch element 126 may be adjusted beneath the reference surface 124 in response to the detected circumstances. Orthogonal guides 130 may be provided to mechanically adjust the location of the touch element 126 beneath the reference surface 124. The touch element 126 may be configured to traverse the orthogonal guides so as to adjust its location. The adjustment may be in response to a control signal received from the control unit 200 and generated based on the circumstances detected by the sensors 160. The orthogonal guides 130 may be arranged to adjust the location of the touch element 126 according to a Cartesian reference frame, as shown, or any other reference frame, such as, for example, a Polar reference frame. Alternatively, single linear guides, circular guides, or any other path-based guides may be utilized in similar manner. The general structure and operation of such guides is known and will not be described further here.

The embodiment shown in FIG. 2 may also include visual indicators 140, which may comprise a physical frame 142 and several light icons 144 (as shown in FIG. 1). The physical frame 142 may be dimensioned so as to form a perimeter defining the active area 122, while the light icons 144 may correspond to icons displayed on a display screen (not shown) in accordance with the software application that the user is interacting with.

The light icons may be backlit via projection from illumination elements 146 coupled to the touch element 126 (either directly or indirectly) and configured to move therewith. The physical frame 142 may also be coupled to the touch element 126 and configured to move therewith. The coupling of the physical frame 142 to the touch element 126 may be such that when the location of the touch element 126 is adjusted in response to the detected circumstances, the locations of the physical frame 142 and the light icons 144 are likewise adjusted. Such coupling may be, for example, via a magnetic coupling between corresponding magnets (not shown) of the touch element 126 and the physical frame 142. In this manner, the user may be visually informed of the dynamic location of the active area 122.

Figure 3:
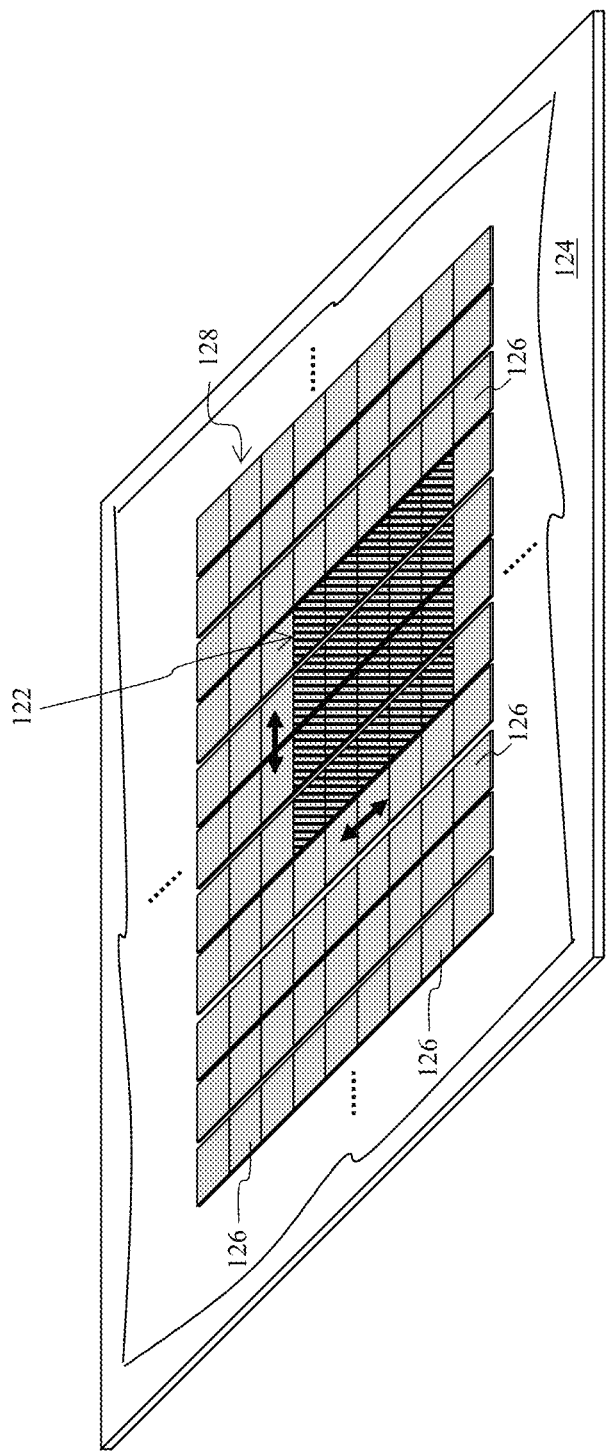
FIG. 3 illustrates the example system in accordance with one or more aspects of the present invention.
Figure 4A:
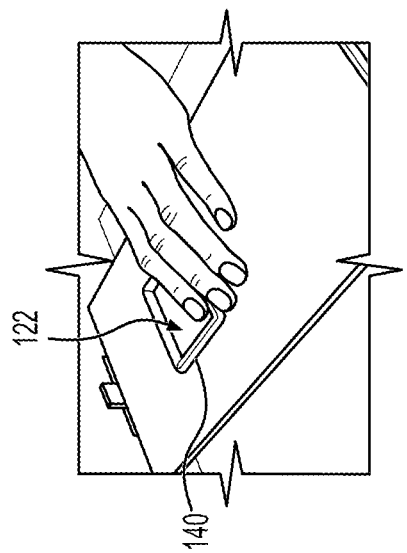
FIGS. 4A to 4F illustrate an exemplary operation of the example system in accordance with one or more aspects of the present invention.
Figure 4B:
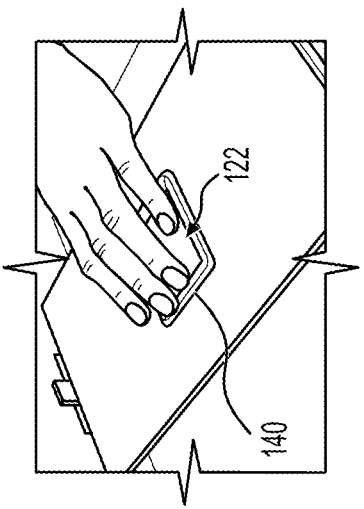
Figure 4C:
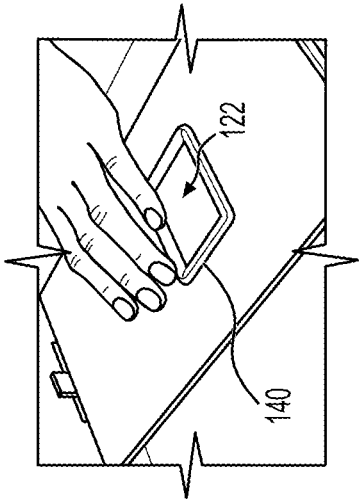
Figure 4D:
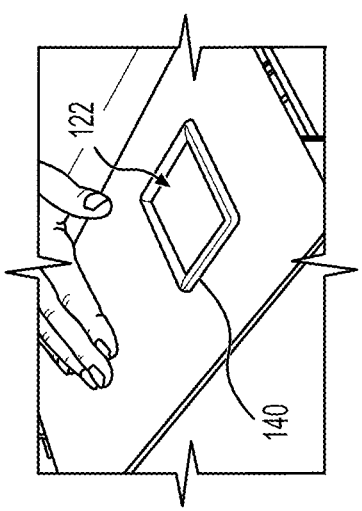
Figure 4E:
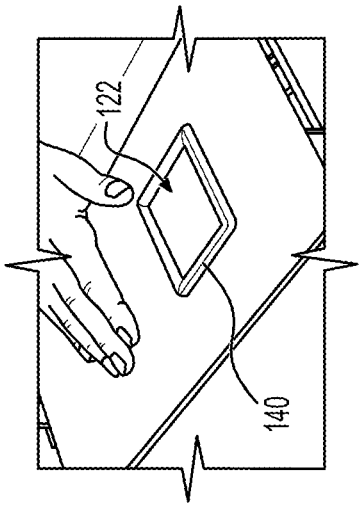
Figure 4F:
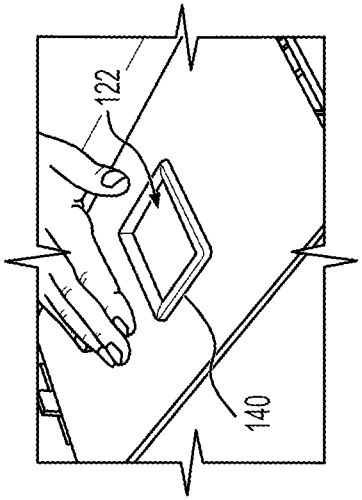
Figure 5:
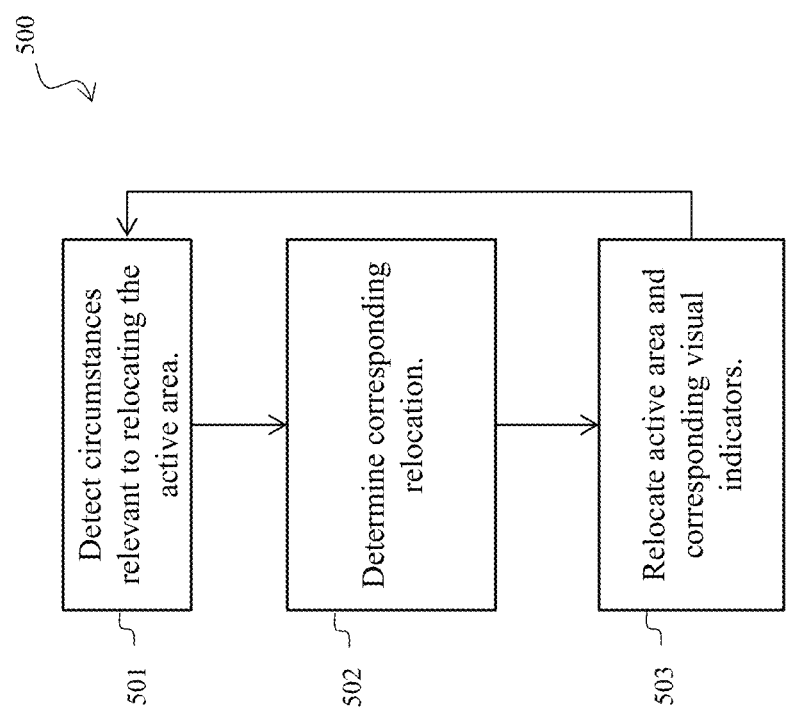
FIG. 5 illustrates a flow diagram of an algorithm used by the example system in accordance one or more aspects of the present invention.

FIG. 3 illustrates an exemplary embodiment in which a plurality of touch elements 126 may be arranged so as to be substantially coextensive with an operational area 128 of the reference surface 124. The touch elements 126 may be configured to individually activate/deactivate, so as to adjust the active area 122 in accordance with the detected circumstances. In the "activated" state (shown by hatching) the touch elements 126 may be configured to register touch input, whereas, in the "deactivated" state, the touch elements 126 may be configured to not register touch input.

For example, as shown in FIG. 3, the location of active area 122 of a grid of touch elements 126 may be adjusted by deactivating the rearmost row of touch elements 126 forming the active area 122, and activating the foremost row of touch elements 126 bordering the active area 122, so as to form the adjusted active area 122. The adjustment may be sequential, as shown in FIG. 3, so that the active area 122 appears progressively moves across the reference surface 124 from a first location to a second location, or it may be accomplished in a single step, so that the active area 122 is deactivated at the first location and then is activated at the second location.

The embodiment shown in FIG. 3 may also include visual indicators 140, which may comprise a light frame 143 and several light icons 144 (shown in FIG. 1). The light frame and icons may be backlit via projection from illumination elements 146 coupled to the touch element 126 (either directly or indirectly). The illumination elements 146 may selectively activate in accordance with the active area 122 so as to backlight project the light frame 163 and icons 164 for use by the user in identifying the location of the touch area 122.

An exemplary operation of the system 100 will now be described with reference to FIGS. 1-3, in which the active area is relocated based on a vehicle mode of operation. In the first instance, the sensors 160 may detect circumstances relevant to the location of the active area 122, such as, for example, that the vehicle is operating in a first driving mode. The control unit 200 may then determine that the first driving mode correlates to the first location for the active area 122. The control unit 200 may then control the system 100 to relocate the active area 122 to the first location from wherever it may currently be located. Where no active area 122 is yet formed, the control unit 200 may control the system 100 to form the active area 122 at the first location. The visual indicators 160 may also be correspondingly moved.

The sensors 160 may then detect changed circumstances relevant to altering the location of the active area 122, such as, for example, that the vehicle is operating in a second driving mode, having been switched from the first driving mode. The control unit 200 may then determine that the second driving mode correlates to the second location for the active area 122. The control unit 200 may then control the system 100 to relocate the active area 122 to the second location from the first location. The visual indicators 160 may also be correspondingly moved.

A further exemplary operation of the system 100 will now be described with reference to FIGS. 1 and 4A-4F, in which the active area 122 relocates by following the detected movement of the user's hand. The sensors 160 may detect circumstances relevant to the location of the active area 122, such as, for example, that the user's hand is moving away from the current location of the active area 122. The control unit 200 may then determine that the new location of the user's hand correlates to the first location for the active area 122. The control unit 200 may then control the system 100 to relocate the active area 122 to the first location from wherever it may currently be located. The visual indicators 160 may also be correspondingly moved. As shown in FIGS. 4A-4F, the resulting impression is that of the active area 122 following the user's hand so as to be readily available for user input.

A method 500 for dynamically adjusting the location of a touch user interface in response to detected circumstances will now be described with reference to FIG. 4.

At step 501, circumstances relevant to relocating the active area 122 of the touch-input interface may be detected by the plurality of sensors 160. Such circumstances may include physical and/or electronic circumstances indicating that the user intends to utilize the touch-input interface at a particular location, such as, for example, the body position, eye gaze, etc. of the user and/or electronic signals indicating a mode of operation (e.g., sport mode, leisure mode, etc.).

At step 502, the control unit 200 may determine that the detected circumstances correlate to the particular location to which the active area 122 is to be relocated. Such correlation may be by way of referencing the database, which may correlate sets of detected circumstances to particular locations for the active area 122.

At step 503, the control unit 200 may control the system 100 to relocate the active area 122 to the particular location. This may involve selectively activating/deactivating and/or mechanically moving one or more touch elements 126 corresponding to the active area 122. The visual indicators 160 may also be correspondingly controlled so as to be relocated with the active area 122.

The objects, advantages and features described in detail above are considered novel over the prior art of record and are considered critical to the operation of at least one embodiment of the present invention and to the achievement of at least one objective of the present invention. The words used in this specification to describe these objects, advantages and features are to be understood not only in the sense of their commonly defined meanings, but also to include any special definition with regard to structure, material or acts that would be understood by one of ordinary skilled in the art to apply in the context of the entire disclosure.

Moreover, various elements described herein generally include hardware and/or software/firmware, including but not limited to: processors, memories, input/output interfaces, operating systems and network interfaces, configured to effectuate the functionalities described herein. When implemented in software, the elements of the invention are essentially the code segments to perform the necessary tasks. The code segments can be stored in a processor readable medium or transmitted by a computer data signal. The "processor readable medium" may include any medium that can store information. Examples of the processor readable medium include an electronic circuit, a semiconductor memory device, a ROM, a flash memory or other non-volatile memory, a floppy diskette, a CD-ROM, an optical disk, a hard disk, etc.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C. An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

Moreover, the definitions of the words or drawing elements described herein are meant to include not only the combination of elements which are literally set forth, but all equivalent structures, materials or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements in a claim without departing from the scope of the present invention.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted in conjunction with the appended claims.

What is claimed is:

1. A dynamic touch user interface system, comprising:
   a touch-input interface having a reference surface covering one or more touch elements that define an active area of the reference surface, which active area allows user communication with a computer through touch;
   one or more visual indicators that visually identify a location of the active area;
   a plurality of sensors that detect circumstances, including a user hand motion above and without touching the touch-input interface,
   wherein the active area is configured to relocate along the reference surface in response to the detected circumstances so as to at least follow the user hand motion,
   wherein the one or more touch elements are mechanical relocatable along the reference surface so as to correspondingly relocate the active area.

2. The system of claim 1, wherein the one or more touch elements are selectively activateable and deactivateable along the reference surface so as to correspondingly relocate the active area.

3. The system of claim 1, wherein the visual indicators include at least one physical object.

4. The system of claim 3, wherein the physical object is coupled to at least one of the touch elements so as to relocate in conjunction therewith.

5. The system of claim 3, wherein the physical object is configured to translate user touch input from the visual indicator to the active area so as to allow user communication with the computer.

6. The system of claim 1, wherein the visual indicators include light objects formed by at least one illumination element.

7. The system of claim 6, wherein the at least one illumination element is coupled to at least one of the touch elements so as to relocate the light object in conjunction therewith.

8. The system of claim 1, wherein the detected circumstances further include one or more of: a driving mode, user body position and user eye gaze.

9. The system of claim 1, wherein the reference surface is an interior surface of a vehicle.

10. A dynamic touch user interface system, comprising:
    a touch-input interface having a reference surface covering one or more touch elements that define an active area of the reference surface, which active area allows user communication with a computer through touch;
    one or more visual indicators that visually identify a location of the active area;

a plurality of sensors that detect circumstances, including a user hand motion above and without touching the touch-input interface;

a control unit operatively coupled via a network to the touch-input interface, the one or more visual indicators, and the plurality of sensors, the control unit configured to:

determine a new location of the reference based on the detected circumstances, relocate the active area along the reference surface to the new location from a current location, so as to at least follow the user hand motion, and relocate the visual indicators in accordance with relocating the active area, wherein the act of relocating the active area includes mechanically relocating the one or more touch elements along the reference surface so as to correspondingly relocate the active area.

11. The system of claim 10, wherein the act of relocating the active area includes selectively activating and/or deactivating the one or more touch elements along the reference surface so as to correspondingly relocate the active area.

12. The system of claim 10, wherein the visual indicators include at least one physical object coupled to at least one of the touch elements so as to relocate in conjunction therewith.

13. The system of claim 10, wherein the physical object is configured to translate user touch input from the visual indicator to the active area so as to allow user communication with the computer.

14. The system of claim 10, wherein the visual indicators include light objects formed by at least one illumination element coupled to at least one of the touch elements so as to relocate the light object in conjunction therewith.

15. The system of claim 10, wherein the detected circumstances include one or more of: a driving mode, user body position and user eye gaze.

16. A method for dynamically relocating a touch user interface, the method comprising:

defining an active area of a reference surface of a touch-input interface, the reference surface covering one or more touch elements, wherein the active area corresponds to a location of the one or more touch elements with respect to the reference surface, which active area allows user communication with a computer through touch;

visually identifying the active area via one or more visual indicators;

detecting circumstances, including a user hand motion above and without touching the touch-input interface;

relocating the active area along the reference surface in response to the detected circumstances so as to at least follow the user hand motion;

visually identifying the relocated active area, wherein relocating the active area includes mechanically relocating the one or more touch elements along the reference surface so as to correspondingly relocate the active area.

17. The method of claim 16, wherein relocating the active area includes selectively activating and/or deactivating the one or more touch elements along the reference surface so as to correspondingly relocate the active area.

* * * * *